United States Patent
Sadeh

(10) Patent No.: US 7,046,855 B2
(45) Date of Patent: May 16, 2006

(54) METHOD AND APPARATUS FOR PERFORMING SPATIAL-TO-FREQUENCY DOMAIN TRANSFORM

(75) Inventor: Yaron M. Sadeh, Kfar Saba (IL)

(73) Assignee: Parthusceva Ltd., Herzlia (IL)

( * ) Notice: Subject to any disclaimer, the term of this patent is extended or adjusted under 35 U.S.C. 154(b) by 722 days.

(21) Appl. No.: 10/282,163

(22) Filed: Oct. 29, 2002

(65) Prior Publication Data

US 2003/0081851 A1 May 1, 2003

Related U.S. Application Data

(60) Provisional application No. 60/330,726, filed on Oct. 29, 2001.

(51) Int. Cl.
*G06K 9/36* (2006.01)
*G06K 9/46* (2006.01)

(52) U.S. Cl. .............................. 382/248; 382/250

(58) Field of Classification Search .............. 382/248, 382/250, 280, 240; 708/400, 402
See application file for complete search history.

(56) References Cited

U.S. PATENT DOCUMENTS

| | | | |
|---|---|---|---|
| 5,822,003 A | 10/1998 | Girod et al. | |
| 6,181,831 B1 * | 1/2001 | Sadjadian | ............... 382/250 |
| 6,587,590 B1 * | 7/2003 | Pan | ............... 382/250 |

FOREIGN PATENT DOCUMENTS

| WO | WO 00/01156 | 1/2000 |
|---|---|---|
| WO | WO 00/21022 | 4/2000 |

OTHER PUBLICATIONS

Murata et al., "Fast 2D IDCT Implementation with multimedia Instructions for a software MPEG2 Decoder", Acoustics, Speech and Signal Processing, 1998, Proceedings of the 1998 IEEE International Conference on Seattle, WA, USA, May 12-15, 1998, New York NY, USA, pp. 3105-3108, XP010279503.

Lengwehasatit et al., "Distortion/decoding time tradeoffs in software DCT-based image coding", Acoustics, Speech and Signal Processing, 1997, ICASSP-97, 1997 IEEE International Conference in Munich, Germany Apr. 21-24, 1997, Los Alamitos, CA, USA, IEEE Comput. Soc, pp. 2725-2728, XP010225719.

\* cited by examiner

*Primary Examiner*—Phuoc Tran
(74) *Attorney, Agent, or Firm*—Pearl Cohen Zedek Latzer, LLP

(57) ABSTRACT

In some embodiments of the present invention, quantized frequency coefficients of a matrix of spatial data are obtained. Blocks of frequency coefficients that will be zero-valued after quantization are identified. Only frequency coefficients belonging to other blocks are calculated explicitly using the spatial-to-frequency transform.

39 Claims, 2 Drawing Sheets

METHOD AND APPARATUS FOR PERFORMING SPATIAL-TO-FREQUENCY DOMAIN TRANSFORM

CROSS-REFERENCE TO RELATED APPLICATIONS

This application claims the benefit of provisional patent application Ser. No. 60/330,726 entitled "METHOD FOR PERFORMING FAST FORWARD 2D-DCT" and filed Oct. 29, 2001.

BACKGROUND OF THE INVENTION

Discrete cosine transform (DCT) coding is a well known image compression technique that yields the desired degree of fidelity to the original image, considering that certain distortions are not discernible by the human eye. It would be beneficial to reduce the amount of time spent on such computations, especially since in some digital video applications, 60 images or more are displayed per second.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
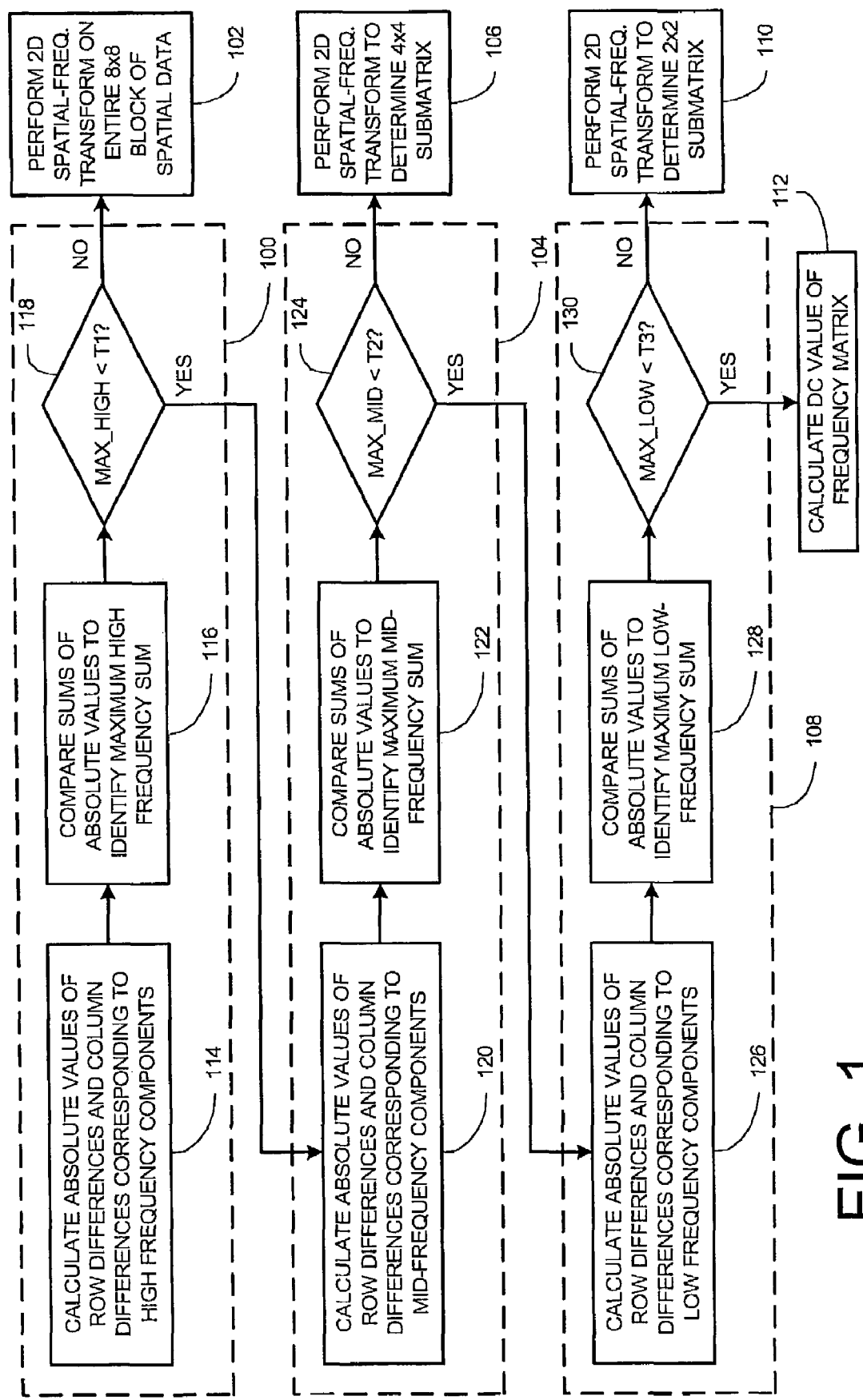
FIG. 1 is a flowchart illustration of a method according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Some embodiments of the present invention are directed to methods for determining a 2-dimensional (2D) matrix of frequency coefficients. The matrix of frequency coefficients ("frequency matrix") may be obtained directly by performing a 2D spatial-to-frequency transform on a block of spatial data. Although the scope of the present invention is not limited in this respect, the spatial-to-frequency transform may be a discrete cosine transform (DCT), a discrete sine transform (DST), a discrete Fourier transform (DFT), a discrete wavelet transform (DWT), and the like. The spatial data may be digital image data, for example, but not limited to, pixel intensities or pixel intensity differences. In particular, the spatial data may be video data.

In many applications, the frequency coefficients are quantized. This may be accomplished by dividing each frequency coefficient by its corresponding quantization value in a quantization matrix. Often the quantized values of the higher frequency coefficients are zero. This is utilized by some embodiments of the present invention in that the spatial-to-frequency transform is not calculated for these higher frequency coefficients, thus accelerating the overall calculation of the frequency matrix.

Moreover, in some embodiments, the acceleration of the frequency coefficient calculations is a function of the quantization scale—coarser quantization yields fewer calculations than finer quantization. Although the scope of the present invention is not limited in this respect, some embodiments are particularly useful in the field of digital video compression since for inter-coded pictures the DCT calculation is performed on a block of pixel intensity differences, for which many of the quantized frequency coefficients are zero.

According to some embodiments of the present invention, a method comprising vector operations enables the estimated identification of submatrices of frequency coefficients in a matrix that have small values and thus will be zero-valued after quantization. This identification may depend on the fineness or coarseness of the quantization. Then only frequency coefficients belonging to other submatrices in the frequency matrix are calculated explicitly using the spatial-to-frequency transform.

Methods according to some embodiments of the present invention may be performed by any suitable computing unit, including but not limited to the central processing unit of a computer, a processor, a digital signal processor, dedicated hardware, or any combination of the above. Software code representing the method may be stored in memory accessible by the computing unit.

An apparatus comprising a computing unit to perform methods according to some embodiments of the present invention may be part of a data compression encoder or trans-coder. Although the scope of the present invention is not limited in this respect, in the particular example of compressed video or compressed image, the encoder or trans-coder may be part of any of the following products:

a) a set-top box comprising an encoding chip or trans-coder chip, the set-top box being battery operated or non-battery operated;

b) a digital video camera comprising an encoder or trans-coder chip and flash memory or digital video (DV) tape;

c) a digital still camera that supports image and/or video encoding and flash memory or compact disk as a storage medium;

d) a multimedia-enabled cellular telephone equipped with a camera and a screen (color or monochrome) for video-conference applications and/or image/video messaging;

e) a multimedia-enabled plain-old telephone system (POTS) telephone equipped with a camera and a screen (color or monochrome);

f) a personal digital assistant (PDA) comprising an encoding chip and/or encoding software and a color or monochrome screen; and g) a game-console comprising an encoder or trans-coder chip and a hard drive or magnetic tape.

FIG. 1 is a flowchart illustration of a method according to some embodiments of the present invention. For clarity of description, the method in FIG. 1 is applied to the example of an 8×8 matrix. However, it will be apparent to one of ordinary skill in the art how to modify the method to apply to matrices of another size, and such modifications are within the scope of the present invention. Moreover, it will be apparent to one of ordinary skill in the art how to modify the method to apply to a 1-dimensional block of data, for example audio, in which case it is a 1D spatial-to-frequency transform that is applied, and such modifications are within the scope of the present invention.

Figure 2A:
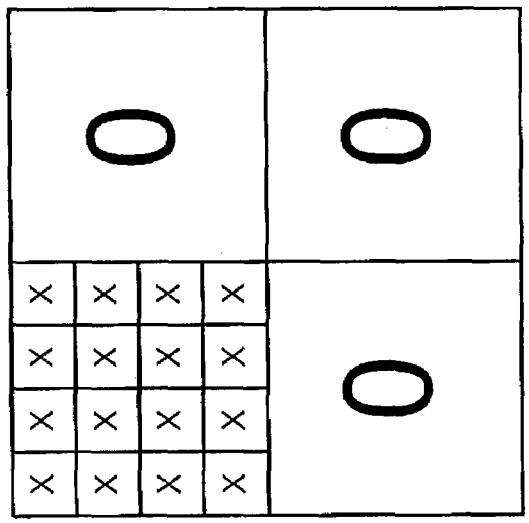
FIGS. 2A–2D are illustrations of 8×8 frequency coefficient matrices, helpful in understanding some embodiments of the present invention.

A sub-method 100, described in more detail hereinbelow, estimates whether the only non-zero elements of an 8×8 quantized frequency coefficient matrix occur in a 4×4 sub-matrix at the top left corner of the frequency matrix. If not, then the 2D spatial-to-frequency transform is applied to the entire 8×8 block of spatial data (step 102), yielding a frequency matrix of the form illustrated in FIG. 2A. If yes, then the three 4×4 submatrices at the bottom left corner, the bottom right corner and the top right corner of the frequency matrix are all zero-valued, and the method continues to sub-method 104.

Figure 2B:
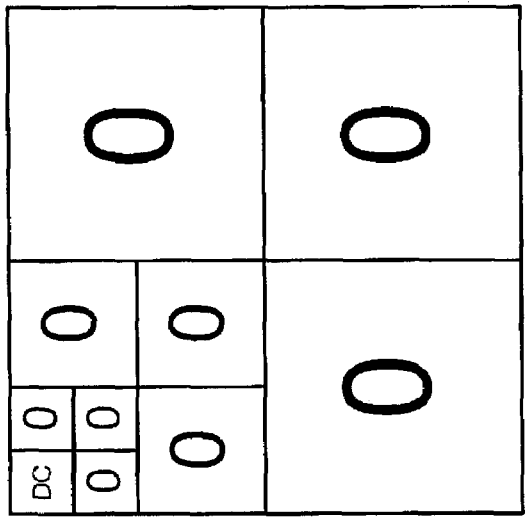

Sub-method 104, described in more detail hereinbelow, estimates whether the only non-zero elements of the frequency matrix occur in a 2×2 submatrix at the top left corner of the frequency matrix. If not, then a 2D spatial-to-frequency transform is applied to determine the 4×4 submatrix at the top left corner of the frequency matrix (step 106), yielding a frequency matrix of the form illustrated in FIG. 2B. If yes, then the three 2×2 submatrices at the bottom left corner, the bottom right corner and the top light corner of the 4×4 submatrix at the top left corner of the frequency matrix are all zero-valued, and the method continues to sub-method 108.

Figure 2C:
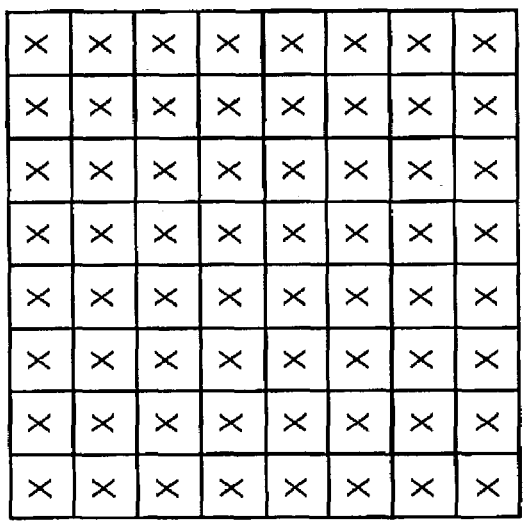
Figure 2D:
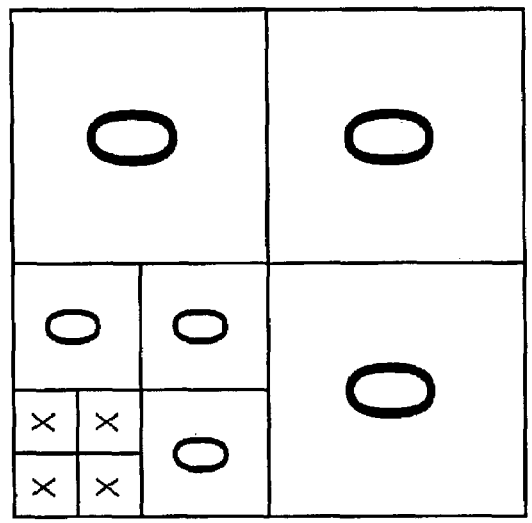

Sub-method 108, described in more detail hereinbelow, estimates whether the only non-zero element of the frequency matrix is the DC element at the top left corner of the frequency matrix. If not, then the 2D spatial-to-frequency transform, described in more detail hereinbelow, is applied to determine the 2×2 submatrix at the top left corner of the frequency matrix (step 110), yielding a frequency matrix of the form illustrated in FIG. 2C. If yes, then the DC frequency coefficient is calculated, as will be described in more detail hereinbelow (step 112), yielding a frequency matrix of the form illustrated in FIG. 2D.

In the following description, elements of an 8×8 block P are referred to by their row and column value P[m][n], where [m] is the row (the P[0][j] row is the top row of the block) and [n] is the column (the P[i],[0] column is the leftmost column of the block).

Sub-method 100 will now be described in more detail. The absolute values of row differences and column differences corresponding to high frequency components is calculated (step 114). High frequency components result primarily from significant changes in the pixel intensity block when moving from one pixel to its neighbor. Many different calculations may express these high frequency components—and they are all included in the scope of the present invention. However, for clarity, only one exemplary calculation will now be described.

Seven vector subtractions on the rows and seven vector subtractions on the columns are performed; fourteen vector subtractions in total. Only half of the pixels in the rows (columns) are involved in each vector subtraction. The row vector subtractions are as follows:

First and Second Rows:
abs(P[0][j]−P[1][j]), j=0, 1, 2, 3

Second and Third Rows:
abs(P[1][j]−P[2][j]), j=4, 5, 6, 7

Third and Fourth Rows:
abs(P[2][j]−P[3][j]), j=0, 1, 2, 3

Fourth and Fifth Rows:
abs(P[3][j]−P[4][j]), j=4, 5, 6, 7

Fifth and Sixth Rows:
abs(P[4][j]−P[5][j]), j=0, 1, 2, 3

Sixth and Seventh Rows:
abs(P[5][j]−P[6][j]), j=4, 5, 6, 7

Seventh and Eighth Rows:
abs(P[6][j]−P[7][j]), j=0, 1, 2, 3

The column subtractions may be expressed in a similar manner.

The absolute numbers related to a given vector subtraction are summed and compared to identify a maximum sum MAX_HIGH (step 116). Mathematically this may be expressed as follows:

$$\text{MAX\_HIGH} = \begin{cases} \sum_{j=0}^{3} \text{abs}(P[0][j] - P[1][j]), \sum_{j=4}^{7} \text{abs}(P[1][j] - P[2][j]), \\ \sum_{j=0}^{3} \text{abs}(P[2][j] - P[3][j]), \sum_{j=4}^{7} \text{abs}(P[3][j] - P[4][j]), \\ \sum_{j=0}^{3} \text{abs}(P[4][j] - P[5][j]), \sum_{j=4}^{7} \text{abs}(P[5][j] - P[6][j]), \\ \sum_{j=0}^{3} \text{abs}(P[6][j] - P[7][j]), \sum_{i=4}^{3} \text{abs}(P[i][0] - P[i][1]), \\ \sum_{i=4}^{7} \text{abs}(P[i][1] - P[i][2]), \sum_{i=0}^{3} \text{abs}(P[i][2] - P[i][3]), \\ \sum_{i=4}^{7} \text{abs}(P[i][3] - P[i][4]), \sum_{i=0}^{3} \text{abs}(P[i][4] - P[i][5]), \\ \sum_{i=4}^{7} \text{abs}(P[i][5] - P[i][6]), \sum_{i=0}^{3} \text{abs}(P[i][6] - P[i][7]) \end{cases}$$

The maximum sum MAX_HIGH is compared to a threshold T1 (step 118). Although the scope of the present invention is not limited in this respect, threshold T1 may be chosen so that only an insignificant percentage of blocks for which the maximum sum MAX_HIGH is below the threshold T1 have some non-zero elements in their corresponding quantized frequency coefficient matrix other than those in the top left 4×4 submatrix.

Although the scope of the present invention is not limited in this respect, in some embodiments of the present invention, threshold T1 may depend upon the quantization matrix. For example, threshold T1 may be determined from the following equation:

$$T1 = \text{Quantization\_scale} \times C1/16,$$

where C1 equals 96 for the MPEG-2 Default Intra quantization matrix, C1 equals 80 for the MPEG-2 Default Non-Intra (Inter) quantization matrix, and Quantization_scale is a factor used in the MPEG standards to change the default quantization matrix to a finer or coarser matrix for each macro-block (16×16 pixels) that is encoded.

Sub-method 104 will now be described in more detail. The absolute values of row differences and column differences corresponding to mid-frequency components are calculated (step 120). Mid-frequency components result primarily from significant changes in the pixel intensity block when moving between rows (columns) separated by a few rows (columns). Many different calculations may express these mid-frequency components—and they are all included in the scope of the present invention. However, for clarity, only one exemplary calculation will now be described, one that checks for significant changes in the pixel intensity block when moving from row (column) 0 to row (column) 3 and when moving from row (column) 4 to row (column) 7.

Two vector subtractions on the rows and two vector subtractions on the columns are performed; four vector subtractions in total. All of the pixels in the rows (columns) are involved in each vector subtraction. The row vector subtractions are as follows:

First and Fourth Rows:
abs(P[0][j]–P[3][j]), j=0, 1, 2, 3, 4, 5, 6, 7

Fifth and Eighth Rows:
abs(P[4][j]–P[7][j]), j=0, 1, 2, 3, 4, 5, 6, 7

The column vector subtractions are as follows:

First and Fourth Columns:
abs(P[i][0]–P[i][3]), i=0, 1, 2, 3, 4, 5, 6, 7

Fifth and Eighth Columns:
abs(P[i][4]–P[i][7]), i=0, 1, 2, 3, 4, 5, 6, 7

The absolute numbers related to a given vector subtraction are summed and compared to identify a maximum sum MAX_MID (step 122). Mathematically this may be expressed as follows:

$$\text{MAX\_MID} = \max\begin{pmatrix} \sum_{j=0}^{7} \text{abs}(P[0][j] - P[3][j]), \sum_{j=0}^{7} \text{abs}(P[4][j] - P[7][j]), \\ \sum_{i=0}^{7} \text{abs}(P[i][0] - P[i][3]), \sum_{i=0}^{7} \text{abs}(P[i][4] - P[i][7]) \end{pmatrix}$$

The maximum sum MAX_MID is compared to a threshold T2 (step 124). Although the scope of the present invention is not limited in this respect, threshold T2 may be chosen so that only an insignificant percentage of blocks for which the maximum sum MAX_MID is below the threshold T2 have some non-zero elements in their corresponding quantized frequency coefficient matrix other than those in the top left 2×2 submatrix.

Although the scope of the present invention is not limited in this respect, in some embodiments of the present invention, threshold T2 may depend upon the quantization matrix. For example, threshold T2 may be determined from the following equation:

$T2 = \text{Quantization\_scale} \times C2/16$, where C2 equals 40 for the MPEG-2 Default Intra quantization matrix and C2 equals 36 for the MPEG-2 Default Non-Intra (Inter) quantization matrix.

If the maximum sum MAX_MID is greater than threshold T2, a 2D spatial-to-frequency transform is applied to determine the 4×4 submatrix at the top left corner of the frequency matrix (step 106). Although the scope of the present invention is not limited in this respect, the transform may be applied, for example, by performing the following method:

a) Convert the original 8×8 pixel intensity (or pixel intensity difference) block P into a 4×4 block P4:
P4[i][j]=P[2i][2j]+P[2i+1][2j]+P[2i][2j+1]' b) Perform a 2D-DCT calculation on the P4 block and scale each of the resulting 16 coefficients (indexed by (u,v), where u,v=0,1,2,3) by its appropriate factor F(u,v)=1/[2 cos(uπ/16)cos(vπ/16)].

Sub-method 108 will now be described in more detail. The absolute values of row differences and column differences corresponding to low frequency components is calculated (step 126). Low frequency components result primarily from significant changes in the pixel intensity block when moving between rows (columns) separated by several rows (columns). Many different calculations may express these low frequency components—and they are all included in the scope of the present invention. However, for clarity, only one exemplary calculation will now be described, one that checks for significant changes in the pixel intensity block when moving between the first and last rows and when moving between the first and last columns.

One vector subtraction on the rows and one vector subtraction on the columns are performed; two vector subtractions in total. All of the pixels in the rows (columns) are involved in each vector subtraction. The row vector subtraction is as follows:

First and Eighth Rows:
abs(P[0][j]–P[7][j]), j=0, 1, 2, 3, 4, 5, 6, 7

The column vector subtraction is as follows:

First and Eighth Columns:
abs(P[i][0]–P[i][7]), i=0, 1, 2, 3, 4, 5, 6, 7

The absolute numbers related to a given vector subtraction are summed and compared to identify a maximum sum MAX_LOW (step 128). Mathematically this may be expressed as follows:

$$\text{MAX\_LOW} = \max\left(\sum_{j=0}^{7} \text{abs}(P[0][j] - P[7][j]), \sum_{i=0}^{7} \text{abs}(P[i][0] - P[i][7])\right)$$

The maximum sum MAX_LOW is compared to a threshold T3 (step 130). Although the scope of the present invention is not limited in this respect, threshold T3 may be chosen so that only an insignificant percentage of blocks for which the maximum sum MAX_LOW is below the threshold T3 have some non-zero elements in their corresponding quantized frequency coefficient matrix other than the DC component.

Although the scope of the present invention is not limited in this respect, in some embodiments of the present invention, threshold T3 may depend upon the quantization matrix. For example, threshold T3 may be determined from the following equation:

$T3 = \text{Quantization\_scale} \times C3/16$, where C3 equals 24 for both the MPEG-2 Default Intra quantization matrix and the MPEG-2 Default Non-Intra (Inter) quantization matrix.

If the maximum sum MAX_LOW is greater than threshold T3, a 2D spatial-to-frequency transform is applied to determine the 2×2 submatrix at the top left corner of the frequency matrix (step 110). Although the scope of the present invention is not limited in this respect, the transform may be applied, for example, by performing the following method:

a) Convert the original 8×8 pixel intensity (or pixel intensity difference) block P into a 2×2 block P2:

$$P2[0][0] = \sum_{i=0}^{3}\sum_{j=0}^{3} P[i][j]; \ P2[0][1] = \sum_{i=0}^{3}\sum_{j=4}^{7} P[i][j];$$

$$P2[1][0] = \sum_{i=4}^{7}\sum_{j=0}^{3} P[i][j]; \ P2[1][1] = \sum_{i=4}^{7}\sum_{j=4}^{7} P[i][j];$$

b) Perform a 2D-DCT calculation on the P2 block and scale each of the resulting 4 coefficients (indexed by (u,v), where u,v=0,1) by its appropriate factor $F(u,v)=1/[8 \cos(u\pi/16)\cos(v\pi/16)]$.

The method described in FIG. 1 was implemented in an MPEG-2 standard video encoder and tested on many video films. On average, approximately 40% of the intra blocks were fully calculated (i.e. reached step 102). Another approximately 50% of the blocks were identified as having a 4×4 non-zero submatrix at the top left corner of the frequency matrix (i.e. reached step 106). Another approximately 9% of the blocks were identified as having a 2×2 non-zero submatrix at the top left corner of the frequency matrix (i.e. reached step 110). Approximately 1% of the blocks had the DC component as the only non-zero component of the frequency matrix (i.e. reached step 112). These statistics were achieved using a constant quantization scale of 8. It will be apparent to persons of ordinary skill in the art that a larger quantization scale will further reduce the percentage of matrices that need to be fully calculated.

For non-intra blocks, approximately 10–25% of the blocks were identified as having a 4×4 non-zero submatrix at the top left corner of the frequency matrix (i.e. reached step 106). Another approximately 15–40% of the blocks were identified as having a 2×2 non-zero submatrix at the top left corner of the frequency matrix (i.e. reached step 110). Approximately 30–70% of the blocks had the DC component as the only non-zero component of the frequency matrix (i.e. reached step 112).

It will be appreciated by persons of ordinary skill in the art that the methods describe hereinabove neither degrade the overall quality of the compressed video nor reduce the compression efficiency. Although the scope of the present invention is not limited in this respect, the thresholds may be defined to ensure complete conformity to the standard calculation or to allow some degree of deviation, which may be visually insignificant.

While certain features of the invention have been illustrated and described herein, many modifications, substitutions, changes, and equivalents will now occur to those of ordinary skill in the art. One trivial example of such a modification is to compare the squares of the row and column differences rather than comparing the absolute value of the row and column differences. In another example, the fourteen vector subtractions performed in step 114 may involve all the pixels in the rows and all the pixels in the columns. It is, therefore, to be understood that the appended claims are intended to cover all such modifications and changes as fall within the true spirit of the invention.

What is claimed is:

1. A method comprising:
    without applying a spatial-to-frequency transform to an entire block of spatial data, identifying one or more submatrices of a frequency matrix corresponding to said block that have non-zero quantized frequency coefficients and applying a modified version of said transform to portions of said spatial data to determine the frequency coefficients of said submatrices; and
    using zero-valued frequency coefficients for coefficients of said frequency matrix not belonging to said submatrices.

2. The method of claim 1, wherein said identified submatrices comprises the direct current (DC) component of said frequency matrix.

3. The method of claim 2, wherein said identified submatrices comprises a 2×2 submatrix at the top left corner of said frequency matrix.

4. The method of claim 3, wherein said identified submatrices comprises a 4×4 submatrix at the top left corner of said frequency matrix.

5. The method of claim 1, wherein coefficients of said identified submatrices correspond to lower frequencies than the coefficients of said frequency matrix not belonging to said submatrices.

6. The method of claim 1, wherein identifying said one or more submatrices comprises:
    comparing results of vector subtractions to a first predetermined threshold, said vector subtractions corresponding to high frequency coefficients of said frequency matrix.

7. The method of claim 6, wherein identifying said one or more submatrices further comprises:
    comparing results of vector subtractions to a second predetermined threshold, said vector subtractions corresponding to mid-frequency coefficients of said frequency matrix.

8. The method of claim 7, wherein identifying said one or more submatrices further comprises:
    comparing results of vector subtractions to a third predetermined threshold, said vector subtractions corresponding to low frequency coefficients of said frequency matrix.

9. The method of claim 1, wherein applying said modified version of said transform comprises:
    comparing results of vector subtractions to a third predetermined threshold, said vector subtractions corresponding to low frequency coefficients of said frequency matrix.

10. The method of claim 1, wherein said transform is a discrete cosine transform.

11. The method of claim 1, wherein said transform is a discrete sine transform.

12. The method of claim 1, wherein said transform is a discrete Fourier transform.

13. The method of claim 1, wherein said transform is a discrete wavelet transform.

14. An article comprising:
    a computer-readable storage medium to store instructions that enable a computing unit to:
        without applying a spatial-to-frequency transform to an entire block of spatial data, identify one or more submatrices of a frequency matrix corresponding to said block that have non-zero quantized frequency coefficients and apply a modified version of said transform to portions of said spatial data to determine the frequency coefficients of said submatrices; and
use zero-valued frequency coefficients for coefficients of said frequency matrix not belonging to said submatrices.

15. The article of claim 14, wherein coefficients of said identified submatrices correspond to lower frequencies than the coefficients of said frequency matrix not belonging to said submatrices.

16. The article of claim 14, wherein said transform is a discrete cosine transform.

17. The article of claim 14, wherein said transform is a discrete sine transform.

18. The article of claim 14, wherein said transform is a discrete Fourier transform.

19. The article of claim 14, wherein said transform is a discrete wavelet transform.

20. An apparatus comprising:
a data compression encoder to identify, without applying a spatial-to-frequency transform to an entire block of spatial data, one or more submatrices of a frequency matrix corresponding to said block that have non-zero quantized frequency coefficients, to apply a modified version of said transform to portions of said spatial data to determine the frequency coefficients of said submatrices and to use zero-valued frequency coefficients for coefficients of said frequency matrix not belonging to said submatrices.

21. The apparatus of claim 20, wherein coefficients of said identified submatrices correspond to lower frequencies than the coefficients of said frequency matrix not belonging to said submatrices.

22. The apparatus of claim 20, wherein said transform is a discrete cosine transform.

23. The apparatus of claim 20, wherein said transform is a discrete sine transform.

24. The apparatus of claim 20, wherein said transform is a discrete Fourier transform.

25. The apparatus of claim 20, wherein said transform is a discrete wavelet transform.

26. A set-top box comprising:
a battery; and
an encoding chip or trans-coder chip to identify, without applying a spatial-to-frequency transform to an entire block of spatial data, one or more submatrices of a frequency matrix corresponding to said block that have non-zero quantized frequency coefficients, to apply a modified version of said transform to portions of said spatial data to determine the frequency coefficients of said submatrices and to use zero-valued frequency coefficients for coefficients of said frequency matrix not belonging to said submatrices.

27. The set-top box of claim 26, wherein coefficients of said identified submatrices correspond to lower frequencies than the coefficients of said frequency matrix not belonging to said submatrices.

28. A digital video camera comprising:
digital video (DV) tape; and
an encoder or trans-coder chip to identify, without applying a spatial-to-frequency transform to an entire block of spatial data, one or more submatrices of a frequency matrix corresponding to said block that have non-zero quantized frequency coefficients, to apply a modified version of said transform to portions of said spatial data to determine the frequency coefficients of said submatrices and to use zero-valued frequency coefficients for coefficients of said frequency matrix not belonging to said submatrices.

29. The digital video camera of claim 28, wherein coefficients of said identified submatrices correspond to lower frequencies than the coefficients of said frequency matrix not belonging to said submatrices.

30. A digital still camera comprising:
flash memory; and
an encoder or trans-coder chip to identify, without applying a spatial-to-frequency transform to an entire block of spatial data, one or more submatrices of a frequency matrix corresponding to said block that have non-zero quantized frequency coefficients, to apply a modified version of said transform to portions of said spatial data to determine the frequency coefficients of said submatrices and to use zero-valued frequency coefficients for coefficients of said frequency matrix not belonging to said submatrices.

31. The digital still camera of claim 30, wherein coefficients of said identified submatrices correspond to lower frequencies than the coefficients of said frequency matrix not belonging to said submatrices.

32. A multimedia-enabled cellular telephone comprising:
a color screen; and
a camera comprising an image/video compression encoder to identify, without applying a spatial-to-frequency transform to an entire block of spatial data, one or more submatrices of a frequency matrix corresponding to said block that have non-zero quantized frequency coefficients, to apply a modified version of said transform to portions of said spatial data to determine the frequency coefficients of said submatrices and to use zero-valued frequency coefficients for coefficients of said frequency matrix not belonging to said submatrices.

33. The multimedia-enabled cellular telephone of claim 32, wherein coefficients of said identified submatrices correspond to lower frequencies than the coefficients of said frequency matrix not belonging to said submatrices.

34. A multimedia-enabled plain-old telephone system telephone comprising:
a color screen; and
a camera comprising an image/video compression encoder to identify, without applying a spatial-to-frequency transform to an entire block of spatial data, one or more submatrices of a frequency matrix corresponding to said block that have non-zero quantized frequency coefficients, to apply a modified version of said transform to portions of said spatial data to determine the frequency coefficients of said submatrices and to use zero-valued frequency coefficients for coefficients of said frequency matrix not belonging to said submatrices.

35. The multimedia-enabled telephone of claim 34, wherein coefficients of said identified submatrices correspond to lower frequencies than the coefficients of said frequency matrix not belonging to said submatrices.

36. A personal digital assistant (PDA) comprising:
a color screen; and
a camera comprising an image/video compression encoder to identify, without applying a spatial-to-frequency transform to an entire block of spatial data, one or more submatrices of a frequency matrix corresponding to said block that have non-zero quantized frequency coefficients, to apply a modified version of said transform to portions of said spatial data to determine the frequency coefficients of said submatrices and to use zero-valued frequency coefficients for coefficients of said frequency matrix not belonging to said submatrices.

37. The personal digital assistant of claim 36, wherein coefficients of said identified submatrices correspond to lower frequencies than the coefficients of said frequency matrix not belonging to said submatrices.

38. A game-console comprising:
a hard drive; and
an encoder or trans-coder chip to identify, without applying a spatial-to-frequency transform to an entire block of spatial data, one or more submatrices of a frequency matrix corresponding to said block that have non-zero quantized frequency coefficients, to apply a modified version of said transform to portions of said spatial data to determine the frequency coefficients of said submatrices and to use zero-valued frequency coefficients for coefficients of said frequency matrix not belonging to said submatrices.

39. The game-console of claim 38, wherein coefficients of said identified submatrices correspond to lower frequencies than the coefficients of said frequency matrix not belonging to said submatrices.

* * * * *